(12) United States Patent
Kerselaers et al.

(10) Patent No.: US 10,763,921 B1
(45) Date of Patent: Sep. 1, 2020

(54) NEAR-FIELD ELECTROMAGNETIC INDUCTION DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/567,242

(22) Filed: Sep. 11, 2019

(51) Int. Cl.
*H04B 5/00* (2006.01)
*H01Q 7/00* (2006.01)

(52) U.S. Cl.
CPC .......... *H04B 5/0081* (2013.01); *H01Q 7/005* (2013.01)

(58) Field of Classification Search
CPC ............................ H04B 5/0081; H01Q 7/005
USPC ................................. 455/41.1–41.3
See application file for complete search history.

(56) References Cited

U.S. PATENT DOCUMENTS

| 8,115,557 | B2 | 2/2012 | Bouttement et al. | |
| 8,746,574 | B2* | 6/2014 | Salfelner | G01S 13/75 235/492 |
| 2015/0318603 | A1* | 11/2015 | Kerselaers | G08C 17/02 381/315 |
| 2017/0062949 | A1* | 3/2017 | Kerselaers | H04B 5/0031 |
| 2017/0125883 | A1* | 5/2017 | Tenno | H01Q 7/06 |

FOREIGN PATENT DOCUMENTS

WO WO-2004/021374 A1 3/2004

OTHER PUBLICATIONS

U.S. Appl. No. 16/155,219; not yet published; 38 pages (Oct. 9, 2018).

* cited by examiner

*Primary Examiner* — Yuwen Pan
*Assistant Examiner* — Angelica M Perez

(57) ABSTRACT

One example discloses a near-field electromagnetic induction (NFEMI) device, including: a near-field magnetic antenna having an inductive coil responsive to near-field magnetic signals; wherein the near-field magnetic antenna is configured to be coupled to a tuning circuit having a variable capacitance adjusting a resonance frequency of the NFEMI device and variable resistance adjusting a bandwidth of the NFEMI device; and a near-field electric antenna having a set of conductive surfaces; wherein the near-field electric antenna is configured to be directly connected to a receiver circuit.

15 Claims, 5 Drawing Sheets

NEAR-FIELD ELECTROMAGNETIC INDUCTION DEVICE

The present specification relates to systems, methods, apparatuses, devices, articles of manufacture and instructions for a near-field electromagnetic induction device.

SUMMARY

According to an example embodiment, a near-field electromagnetic induction (NFEMI) device, comprising: a near-field magnetic antenna having an inductive coil responsive to near-field magnetic signals; wherein the near-field magnetic antenna is configured to be coupled to a tuning circuit having a variable capacitance adjusting a resonance frequency of the NFEMI device and variable resistance adjusting a bandwidth of the NFEMI device; and a near-field electric antenna having a set of conductive surfaces; wherein the near-field electric antenna is configured to be directly connected to a receiver circuit.

In another example embodiment, the tuning circuit is coupled between the near-field magnetic antenna and a transmitter circuit.

In another example embodiment, the tuning circuit is not coupled between the near-field electric antenna and the receiver circuit.

In another example embodiment, the near-field electric antenna is configured to be directly connected to an LNA in the receiver circuit.

In another example embodiment, one of the conductive surfaces is configured to be directly connected to a first input of an LNA in the receiver circuit; and another one of the conductive surfaces is configured to be directly connected to a second input of the LNA.

In another example embodiment, the inductive coil, the variable capacitance and the variable resistance form a variable inductance.

In another example embodiment, the variable inductance (Lv) is defined as $L_v = L_1 + L_{vir} + 2\,k\sqrt{L_1 L_{vir}}$; and L1 an inductance of the inductive coil, k is the coupling coefficient between the inductive coil and a second inductive coil and Lvir is the virtual inductance.

In another example embodiment, the vvirtual inductance (Lvir) is $$L_{vir} = \frac{X_{Ctune} X_{L2}}{\omega(X_{L2} + X_{Ctune})};$$

and XCtune is a reactance of the variable capacitance, XL2 is a reactance of a second inductive coil and w is a radial resonance frequency.

In another example embodiment, the near-field magnetic antenna is responsive to non-propagating quasi-static magnetic near-field signals; and the near-field electric antenna is responsive to non-propagating quasi-static electric near-field signal.

According to an example embodiment, a near-field electromagnetic induction device, comprising: a near-field magnetic antenna having a first-end-point and a second-end-point; wherein the near-field magnetic antenna includes a first inductor (L1) coupled to the first-end-point, a second inductor (L2) coupled to the second-end-point, and the first and second inductors coupled together at a mid-point; a near-field electric antenna having a first conductive surface and a second conductive surface; wherein the first-end-point of the magnetic antenna is coupled to the first conductive surface of the electric antenna, and is configured to be coupled to a near-field receiver circuit; wherein the second-end-point of the magnetic antenna is coupled to the second conductive surface of the electric antenna, and is configured to be coupled to the near-field receiver circuit and a near-field transmitter circuit; and wherein the mid-point of the magnetic antenna is configured to be coupled to the near-field transmitter circuit.

In another example embodiment, further comprising a tuning circuit is coupled between the near-field magnetic antenna and the transmitter circuit.

In another example embodiment, the tuning circuit is not coupled between the near-field electric antenna and the receiver circuit.

In another example embodiment, the tuning circuit includes a variable capacitance and a variable resistance; and the first inductor, the second inductor, the variable capacitance and the variable resistance form a variable inductance.

In another example embodiment, the near-field electric antenna is configured to be directly connected to an LNA in the receiver circuit.

In another example embodiment, the first conductive surface is configured to be directly connected to a first input of an LNA in the receiver circuit; and the second conductive surface is configured to be directly connected to a second input of the LNA.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1A:
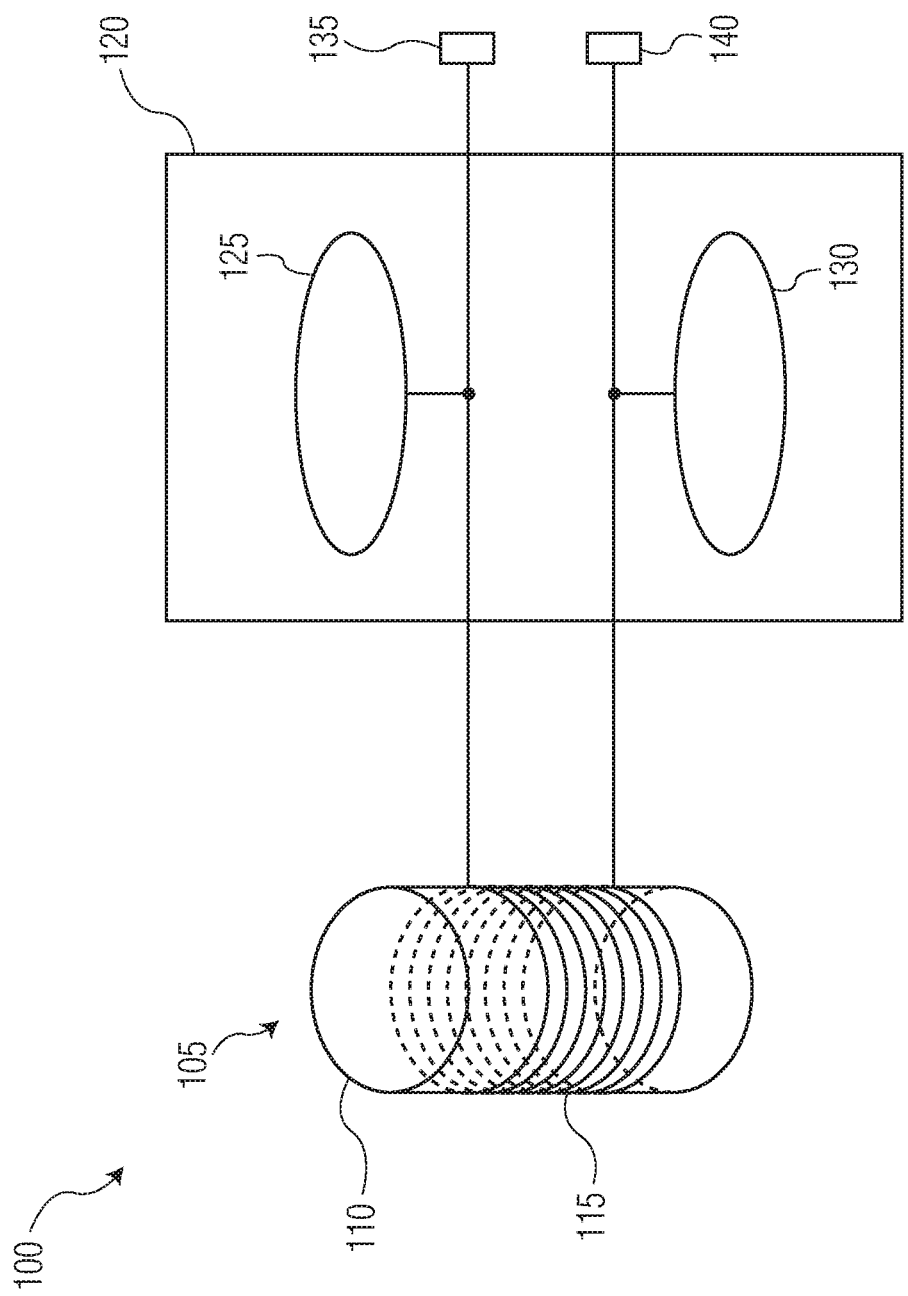
FIG. 1A is a first example near-field antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are near-field interactions between a near-field device, perhaps on a user's body, and other conductive surfaces and/or other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance surfaces at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive surface (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1A is an example near-field electromagnetic induction (NFEMI) antenna 100 for use in a wireless device. The antenna 100 in this example is an electromagnetic induction (NFEMI) antenna. In some example embodiments, the antenna 100 includes a magnetic (H-field) antenna 105 (e.g. small loop antenna) in conjunction with an electric (E-field) antenna 120 (e.g. short loaded dipole). The magnetic antenna 105 includes a ferrite core 110 wound with a wire coil 115. The electric (E-field) antenna 120 includes two loading plates 125 and 130. Antenna 100 feed points 135, 140 are coupled to various transceiver circuitry, such as downstream radio transmitter and receiver integrated circuit (RF-IC), (not shown here).

The electric (E-field) antenna 120 is responsive to an electric (E) field. The magnetic antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced. The size of the magnetic antenna 105 and the transmit frequency are chosen to reduce any far field radiation that may be created by the magnetic antenna 105. For example, the size of the magnetic antenna 105 wire coil 115 can be 2 mm in diameter and 6 mm in length and the transmit frequency kept below 50 MHz.

Figure 1B:
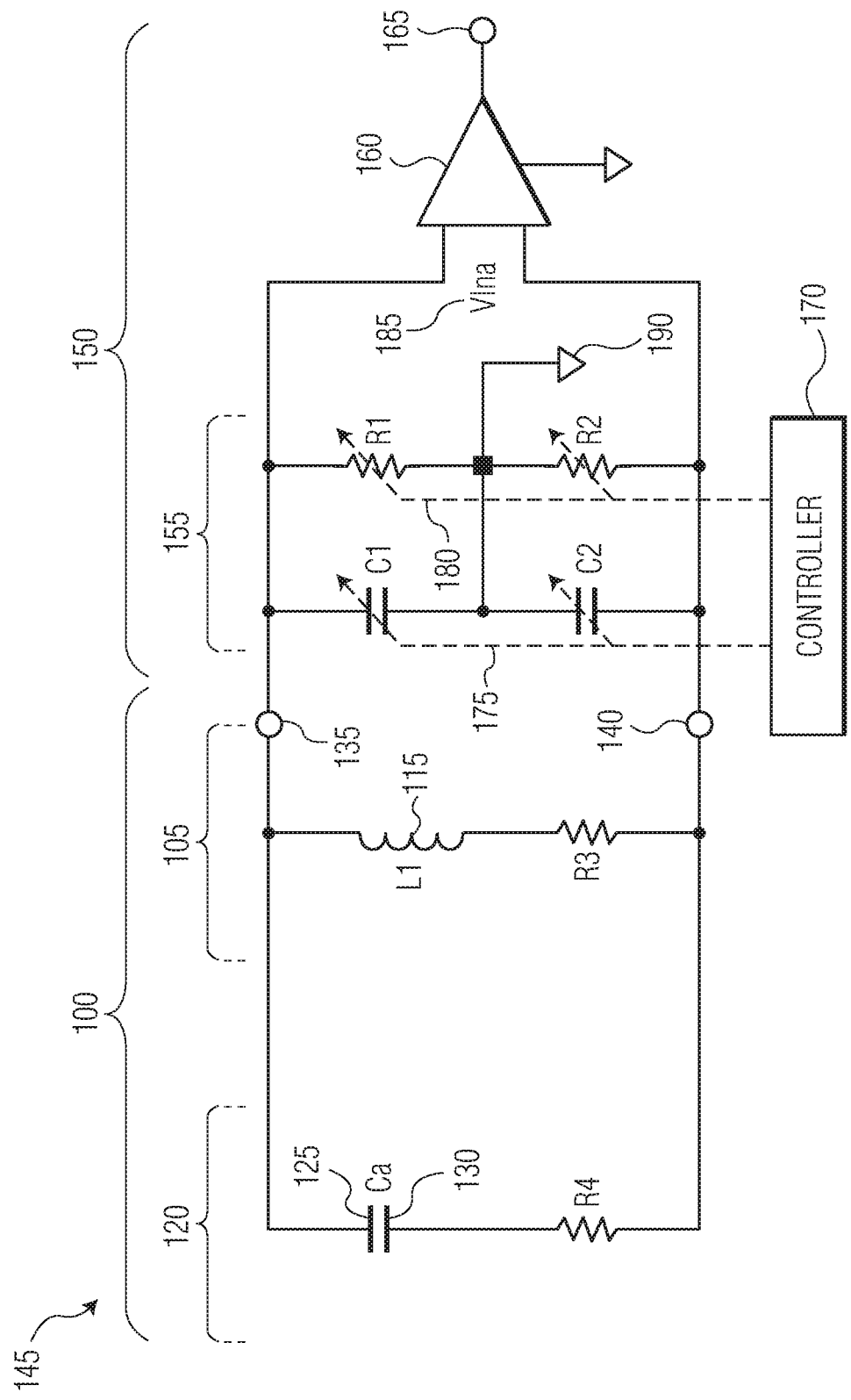
FIG. 1B is an example idealized electrical equivalent of a near-field device coupled to the near-field antenna and configured to receive a non-propagating quasi-static near-field signal.

FIG. 1B is an example 145 idealized electrical equivalent of a near-field device 150 coupled to the near-field antenna 100 and configured to receive (e.g. in a receive mode) a non-propagating quasi-static near-field signal.

The example idealized antenna 100 includes the magnetic (H-field) antenna 105 having a resistance (R3) and an inductance (L1), the electric (E-field) antenna 120 having a conductive structure formed from the two loading plates 125 and 130, and the two feeding points 135, 140.

The near-field device 150 includes a tuning circuit 155, an LNA 160 (low noise amplifier), a communications signal interface 165, and a controller 170.

The tuning circuit 155 is coupled to the first and second feed points 135, 140. The tuning circuit 155 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 190 (e.g. a ground potential). The capacitive banks are coupled to the controller 170 by control line 175, and the resistance banks are coupled to the controller 170 by control line 180.

The controller 170 adjusts the first and second capacitance banks (C1), (C2) to adjust a resonant frequency of the magnetic 105 and the electric 120 antennas (e.g. to 10.6 MHz). The controller 170 adjusts the first and second resistance banks (R1), (R2) to adjust a bandwidth of the magnetic 105 and the electric 120 antennas (e.g. to 400 KHz) sufficient to allow the non-propagating quasi-static near-field signal to be received from the antennas 105, 120.

In this example 145, the capacitance banks (C1), (C2) are equally tuned using the control line 175 from the controller 170, and the resistance banks (R1), (R2) are equally tuned using the control line 180 from the controller 170.

An LNA 160 (low noise amplifier) is coupled between the tuning circuit 155 and a communications signal interface 165. When the antenna 100 and device 150 are receiving the non-propagating quasi-static near-field signal, induced voltage 185 (Vlna) is present across the LNA 160 differential inputs. The LNA 160 amplifies the received near-field signal which is then further processed by additional radio/RFIC/ baseband circuits (not shown) coupled to the communications signal interface 165. The LNA 160 is also coupled to the reference potential 190.

Since both inputs to the LNA 160 are coupled to the antennas 105, 120 this near-field device configuration is said to be balanced. The balanced circuit configuration helps reject interference signals that enter both LNA 160 input lines with the same amplitude and phase. In other examples an unbalanced device 150 can be used.

During operation a voltage is induced in the electric (E-field) antenna 120 by a received near-field electric signal. This voltage generates a current through the E-field antenna 120.

When the near-field antenna 100 is in resonance, currents through the magnetic (H-field) antenna 105 have a same amplitude as a total current through both the E-field antenna 120 and the tuning capacitors C1 and C2. As a result, a gain of the E-field antenna 120 is less than a gain of the magnetic antenna L1 since the E-field antenna 120 loses current to the tuning capacitors C1 and C2.

Gain of the electric (E-field) antenna 120 is herein defined as:

$$\text{gain}=U/E$$

Where U is a voltage across the feed points 135, 140 (i.e. across the LNA 160) in Volts and E is an induced voltage in series with the electric (E-field) antenna 120 (Volts).

The electric (E-field) antenna 120 gain can be expressed as function of circuit components of the antenna system:

$$\text{Gain} = Q \frac{C_a}{C_a + C_{tune}}$$

Where:
Q=quality factor of the resonance circuit
$C_a$=antenna capacitance in Farad
$C_{tune}$=tuning capacitors C1 and C2 in Farad $$C_{tune} = \frac{C_1}{2}$$

when $C_1=C_2$

For example, an NFEMI system operating at 10.6 MHz with a bandwidth of 400 KHz has a quality factor of 26.5. For an antenna capacitance (Ca) of 2 pF and a coil (L1) inductance of 3.6 uH a tuning capacitor (C1, C2) of 60.6 pF is required. In this example the electric (E-field) antenna's 120 gain is a little less than 0 dB. Thus the voltage at the LNA 160 from the electric (E-field) antenna 120 is just about equal to the voltage generated by the electric (E-field) antenna 120. The voltage received from the magnetic (H-field) antenna 105 however is often much higher since its current is not reduced by the tuning capacitors C1 and C2.

Figure 2A:
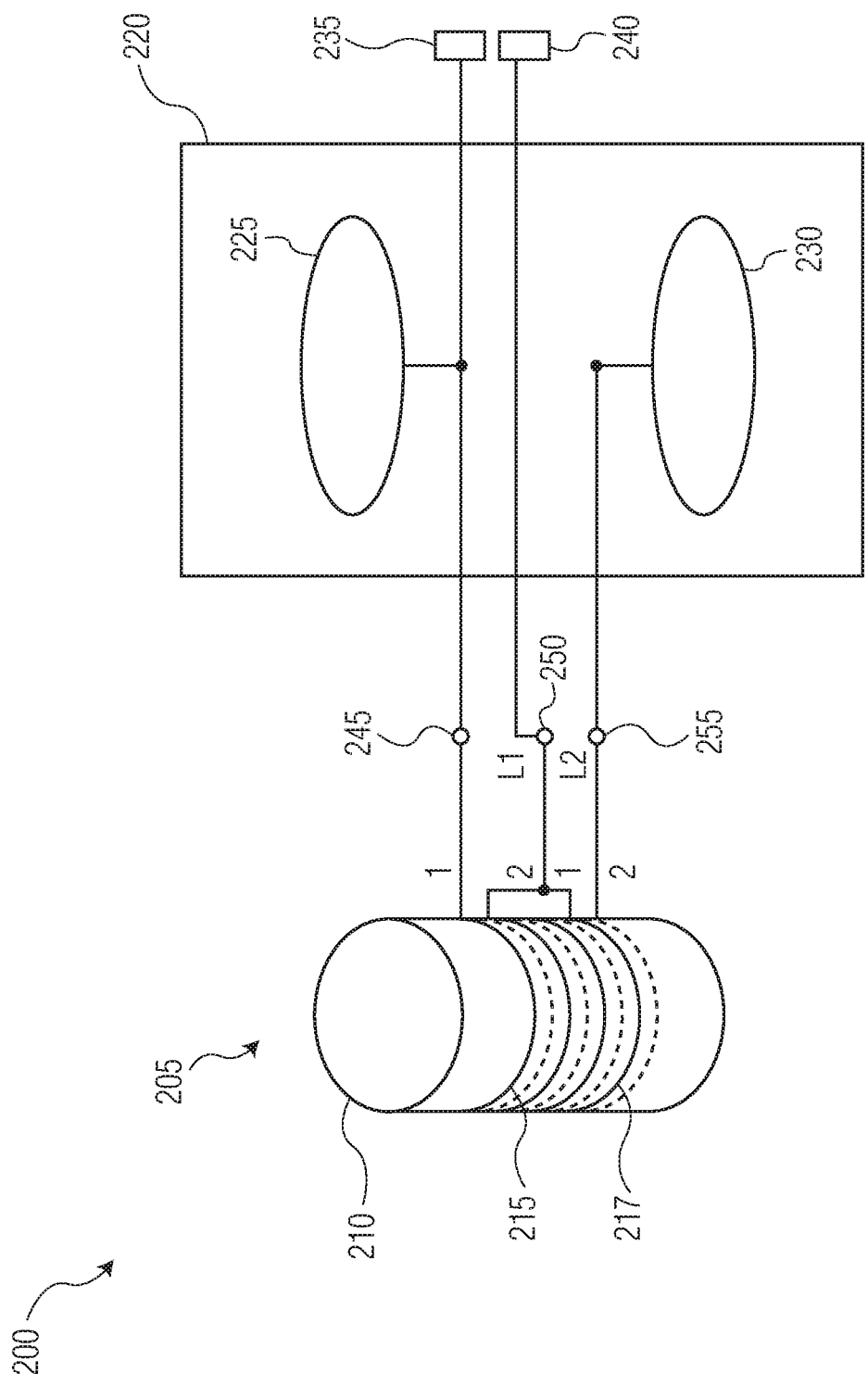
FIG. 2A is an example idealized dual coil NFEMI antenna.

FIG. 2A is an example idealized dual coil NFEMI antenna 200. The antenna 200 includes an electric (E-field) antenna 220 with two conductive structures 225, 230 (e.g. loading plates) and a magnetic (H-field) antenna 205.

The magnetic (H-field) antenna 205 includes at least two coupled coils 215 and 217. The first coil 215 has an inductance of L1, and the second coil 217 has an inductance of L2. Both coils 215 and 217 may be connected, at connection 250, such that they form a larger inductance compared with the inductance of the first coil 215 and the second coil 217. In some example embodiments, both coils 215 and 217 are air coils, or wrapped around a ferrite core 210, while in other example embodiments they are planar and on a substrate.

In the ferrite core 210 embodiment, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection 245 couples one end of the first coil 215 to a first feeding connection 235 and to the first conductive structure 225 of the electric (E-field) antenna 220. Connection 250 couples another end of the first coil 215 to one end of the second coil 217 and to a second feeding connection 240. Connection 255 couples another end of the second coil 217 to the second structure 230 of the electric (E-field) antenna 220.

Figure 2B:
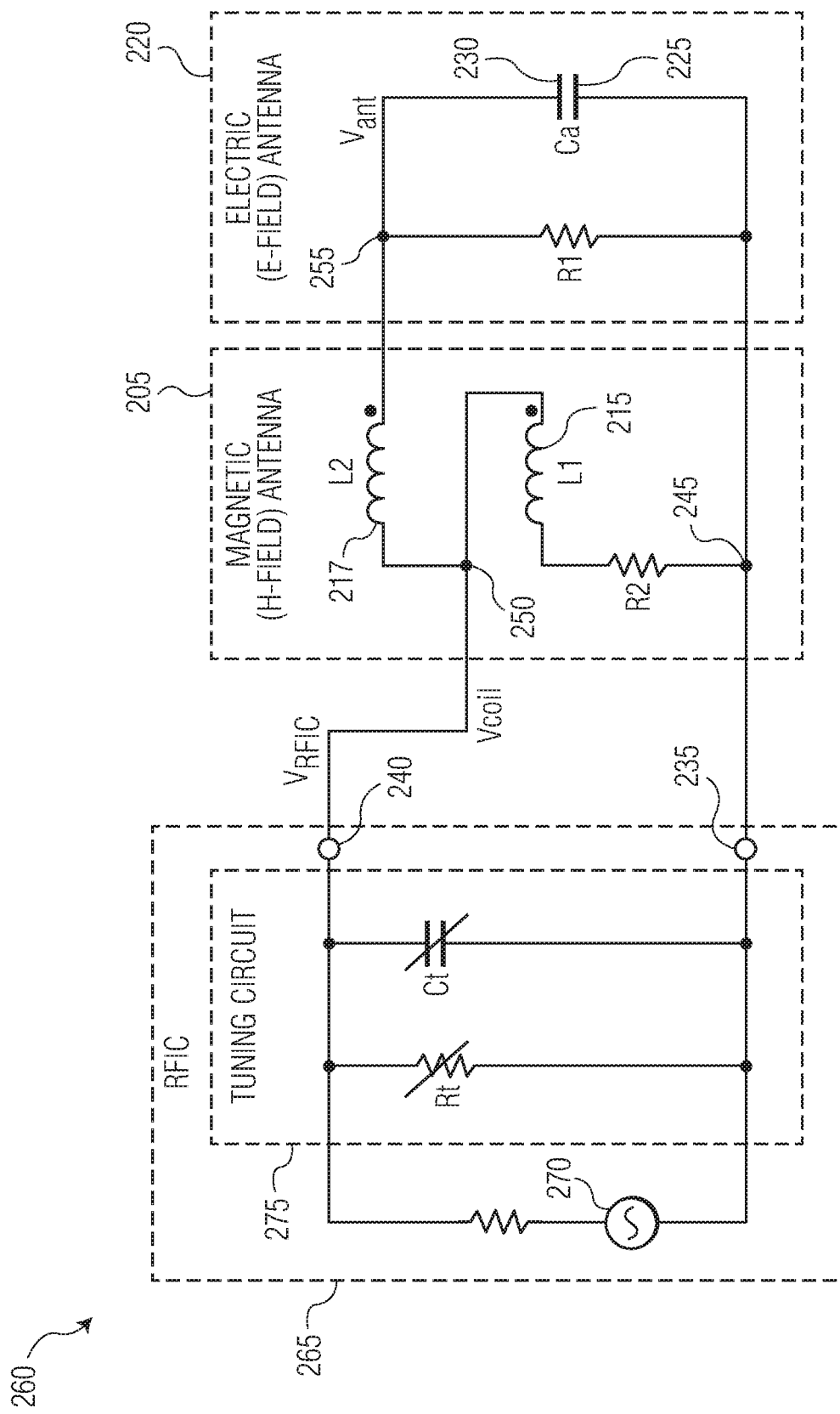
FIG. 2B is an example RFIC circuit coupled to the dual coil NFEMI antenna.

FIG. 2B is an example 260 RFIC circuit 265 (e.g. transmit and/or receive circuit) coupled to the dual coil NFEMI antenna 200. In this example 260, only the RFIC's 265 transmit circuitry is shown, however the RFIC 265 also includes receive circuitry having a low noise amplifier (LNA).

Voltage $V_{RFIC}$ at feed connection 240 in the transmit mode is a transmit voltage (Vtx) generated by a voltage source 270 in the RFIC circuit 265. In this example embodiment, the transmit voltage on the magnetic (H-field) antenna 205 (i.e. Vcoil) and the transmit voltage on the electric (E-field) antenna 220 (i.e. Vant) are not the same as $V_{RFIC}$ (i.e. Vtx) due to the presence of the second coil 217 (L2), as is discussed further below.

Vcoil across the magnetic (H-field) antenna 205 generates a current through coil L1. R2 is the loss resistance of the coil L1 and coil L2 together. Current through the coil L1 generates a magnetic (H) field. The H-field is a linear function of the current through the coil L1.

The voltage Vant across the electric (E-field) antenna 220 is higher than Vcoil since Vcoil is applied between coil 215 (L1) and coil 217 (L2) and coil 217 (L2) further increases Vcoil according to the following equations:

$$V\text{ant}=V\text{coil}+k\ V\text{coil}$$

$$k=M/\sqrt{L1*L2}$$

... where:
Vant=voltage across the electric (E-field) antenna 220;
Vcoil=voltage on coil L1
k=magnetic coupling factor between the coil 215 (L1) and coil 217 (L2)
L1=inductance of coil 215
L2=inductance of coil 217
M=mutual inductance between coil 215 (L1) and coil 217 (L2)

The voltage Vant across the electric (E-field) antenna 220 charges the conductive structures 225, 230 and generates an electric (E) field between the conductive structures 225, 230 and its environment. The generated electric field is a linear function of the Vant voltage across the conductive structures 225, 230 and thus a higher electric field is created for the same Vcoil (e.g. Vtx) voltage. Both the H-field and E-field are quasi static in nature and do not substantially radiate in the far-field.

In example embodiments where coil 215 (L1) and coil 217 (L2) are similar and strongly magnetically coupled (k=0.99), the voltage Vant at the short-loaded dipole will be twice the voltage on coil 215 (L1) when the reactance of the dipole antenna is much larger as the reactance of the coil 217 (L2). Note: E, where: E=Electric field [Volts/meter].

However, as with respect to the examples in FIGS. 1A and 1B, when the NFEMI antenna 200 is in resonance, currents through the magnetic (H-field) antenna 205 have a same amplitude as a total current through both the E-field antenna 220 and the variable capacitance Ct. As a result, a gain of the E-field antenna 220 is less than a gain of the magnetic (H-field) antenna 205 since the E-field antenna 220 loses current to the variable capacitance Ct.

Now discussed are example near-field devices that have an improved electric (E-field) antenna gain. Gain is herein defined to include a voltage generated across the electric (E-field) antenna in response to near-field electric (E-field) signals.

Figure 3:
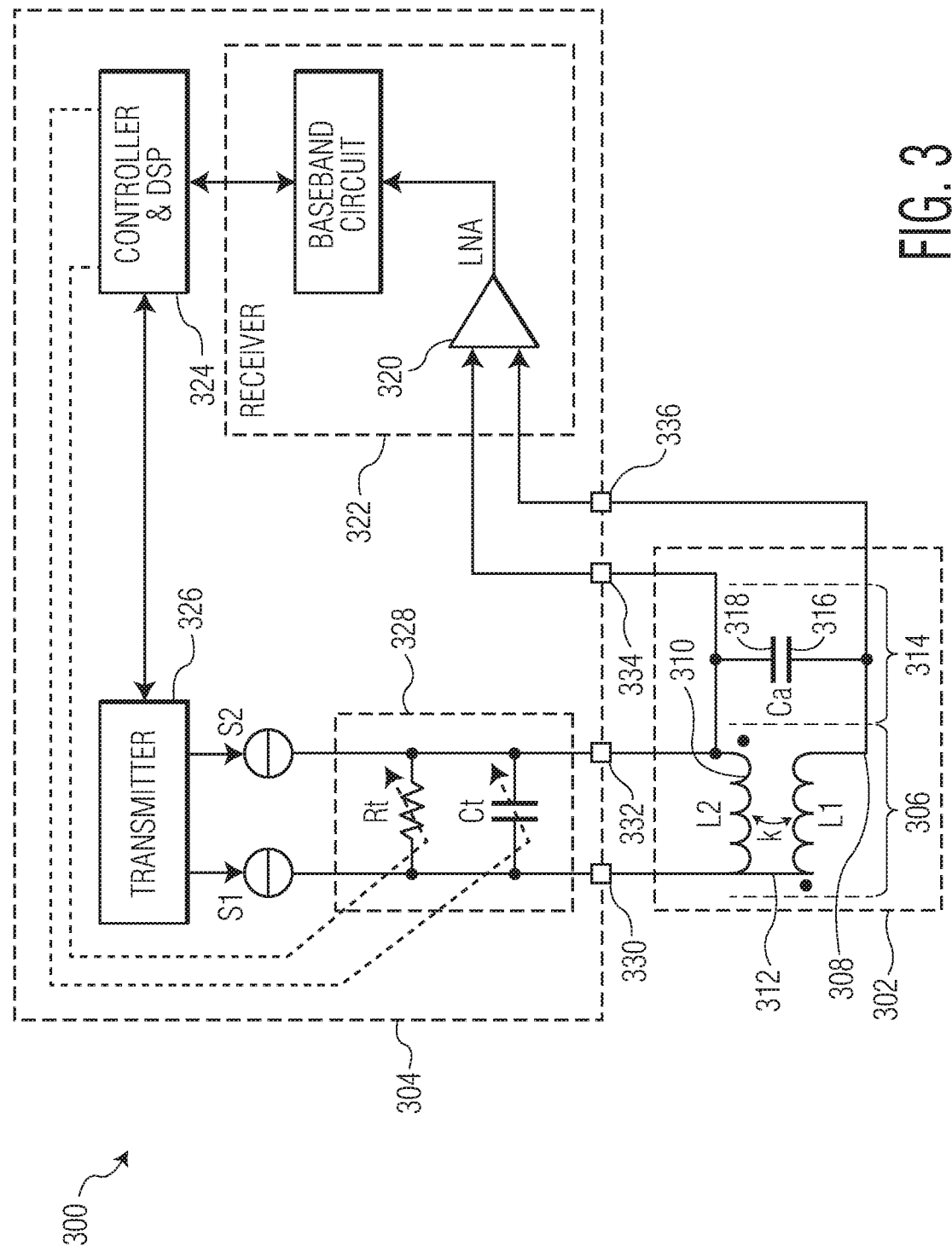
FIG. 3 is an example near-field electromagnetic induction device.

FIG. 3 is an example near-field electromagnetic induction device 300. The device 300 includes a near-field device 302 and a transceiver 304.

The near-field device 302 includes a magnetic (H-field) antenna 306 having a first-end-point 308, a second-end-point 310, a mid-point 312, an inductance (L1), and an inductance (L2). The near-field device 302 also includes an electric (E-field) antenna 314 having a first conductive surface 316 and a second conductive surface 318 thereby forming a capacitance (Ca).

The transceiver 304 includes a receiver 322, a controller & DSP (Digital Signal Processor) 324, a transmitter 326, a set of current sources S1, S2, and a tuning circuit 328 including a variable resistance (Rt) and a variable capacitance (Ct). The receiver 322 includes an LNA 320 and baseband circuits. Various feed-points 330, 332, 334, 336 are also shown.

The first inductor (L1) is coupled to the first-end-point 308, the second inductor (L2) is coupled to the second-end-point 310, and the first and second inductors L1, L2 are coupled together at the mid-point 312.

The first-end-point 308 of the magnetic antenna 306 is coupled to the first conductive surface 316 of the electric antenna 314. The first conductive surface 316 is also coupled at feed-point 336 to the LNA 320 in the receiver circuit 322.

The second-end-point 310 of the magnetic antenna 306 is coupled to the second conductive surface 318 of the electric antenna 314, and to both the receiver circuit 322 and the transmitter circuit 326 at feed-points 332 and 334.

The mid-point 312 of the magnetic antenna 306 is coupled to the near-field transmitter circuit 326 at feed-point 330.

FIG. 3 shows that the tuning circuit 328 is not coupled between the near-field electric antenna 306 and the receiver circuit 322, but is instead coupled between the magnetic antenna 306 and the transmitter circuit 326.

The tuning circuit's 328 variable capacitance (Ct) in response to control signals from the controller & DSP 324 adjusts a resonance frequency of the NFEMI device 300. The tuning circuit's 328 variable resistance (Rt) in response to control signals from the controller & DSP 324 adjusts a bandwidth of the NFEMI device 300.

FIG. 3 also shows the near-field electric antenna 314 is directly connected to the receiver circuit 322. More specifically, the first conductive surface 316 is directly connected to a first input of the LNA 320 and the second conductive surface 318 is directly connected to a second input of the LNA 320.

In other words the electric (E-field) antenna 314 is connected in parallel with the inductors L1 and L2 and the tuning circuit 328.

Together L1, L2, Rt and Ct can be thought of as a variable inductance $L_v$ that also tunes the near-field device 302 to resonance.

The value of $L_v$ is given by:

$$L_v = L_1 + L_{vir} + 2k\sqrt{L_1 L_{vir}}$$

where:
L1 inductance L1 (in Henry),
k coupling coefficient between the two inductors (L1 and L2), and
Lvir virtual inductance (in Henry).
Lvir is defined as:

$$L_{vir} = \frac{X_{Ctune} X_{L2}}{\omega(X_{L2} + X_{Ctune})}$$

where:
$X_{Ctune}$ reactance of the tuning capacitor (Ohm)
$X_{L2}$ reactance of the second coil (Ohm)
$\omega$ radial resonance frequency (Hz)

Controller 324 adjustments to the tuning circuit 328 thus also affect the variable inductance $L_v$ and the resultant gain of the electric (E-field) antenna 314.

The above formulas are most accurate (e.g. valid) when the main resonating circuit is formed by $L_2$ and $C_a$ and $L_2 \ll L_1$.

During operation, voltages induced in the electric (E-field) antenna 314 by near-field electric signals generate a current through the electric (E-field) antenna 314 and through Lv (i.e. the variable inductance).

Since the system is in resonance the current through Lv, the magnetic (H-field) antenna 306, and the electric (E-field) antenna 314 have the same amplitude.

The gain of the electric (E-field) antenna 314 is: Gain=Q (i.e. the Quality Factor of the combined near-field antennas 306, 314).

In some example embodiments, $L_2$ cannot be very small compared with $L_1$ otherwise the tuning range will be too small. For example, a sufficient tuning range is provided if $L_1 \approx 5\ L_2$, then: Gain$\approx$0.5 Q.

Thus the electric (E-field) antenna 314 gain is thus much higher compared with the circuits shown in FIGS. 2A and 2B. For example, the electric (E-field) antenna 314 gain in some example embodiments can be as high as 22 dB, instead of about 0 dB as discussed above in FIGS. 2A and 2B.

Also, using the circuit of FIG. 3, a noise floor primarily defined by an input resistance of the LNA 320 of the electric (E-field) antenna 314 is not increased, thereby resulting in an improved SNR at the LNA 320.

For example, a NFeMI system resonated at 10.6 MHz with a bandwidth of 400 KHz and a first coil with an inductance of 10 uH and a second coil with an inductance of 2 uH both coupled with a coupling coefficient of 0.95 results in a gain of 22 db. This is 23.4 db higher as the prior art solution.

Thus, for a same bandwidth, the SNR (signal to noise ratio) is also increased since the thermal noise level is not changed. The voltage on the electric (E-field) antenna 314 is now higher compared with the power amplifier output voltage since the voltage on inductance (L1) is higher than on the inductance (L2) since $L_1$ is higher than $L_2$.

The near-field device 302 in various applications can be included in: a wireless audio device, an IoT device, a smart-lock, a tag, a wearable patch, arrayed in a smart-fabric, as part of a wireless body network, in an identification system, on or nearby industrial equipment, as part of a measurement or control system, and/or for enabling inter or intra vehicle communications (e.g. V2X, transit, bicycles, cars, etc.).

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field electromagnetic induction (NFEMI) device, comprising:
   a near-field magnetic antenna having an inductive coil responsive to near-field magnetic signals;
   wherein the near-field magnetic antenna is configured to be coupled to a tuning circuit having a variable capacitance adjusting a resonance frequency of the NFEMI device and variable resistance adjusting a bandwidth of the NFEMI device; and
   a near-field electric antenna having a set of conductive surfaces;
   wherein the near-field electric antenna is configured to be directly connected to a receiver circuit;
   wherein one of the conductive surfaces is configured to be directly connected to a first input of an LNA in the receiver circuit; and
   wherein another one of the conductive surfaces is configured to be directly connected to a second input of the LNA.

2. The device of claim 1:
   wherein the tuning circuit is coupled between the near-field magnetic antenna and a transmitter circuit.

3. The device of claim 2:
   wherein the tuning circuit is not coupled between the near-field electric antenna and the receiver circuit.

4. The device of claim 1:
   wherein the near-field electric antenna is configured to be directly connected to an LNA in the receiver circuit.

5. The device of claim 1:
   wherein the inductive coil, the variable capacitance and the variable resistance form a variable inductance.

6. The device of claim 5:
   wherein the variable inductance (Lv) is defined as $L_v = L_1 + L_{vir} + 2k\sqrt{L_1 L_{vir}}$; and
   wherein L1 an inductance of the inductive coil, k is the coupling coefficient between the inductive coil and a second inductive coil and Lvir is a virtual inductance.

7. The device of claim 6:
   wherein the virtual inductance (Lvir) is defined as $$L_{vir} = \frac{X_{Ctune} X_{L2}}{\omega(X_{L2} + X_{Ctune})};$$

and
   wherein XCtune is a reactance of the variable capacitance, XL2 is a reactance of a second inductive coil and w is a radial resonance frequency.

8. The device of claim 1:
wherein the near-field magnetic antenna is responsive to non-propagating quasi-static magnetic near-field signals; and
wherein the near-field electric antenna is responsive to non-propagating quasi-static electric near-field signal.

9. A near-field electromagnetic induction device, comprising:
a near-field magnetic antenna having a first-end-point and a second-end-point;
wherein the near-field magnetic antenna includes a first inductor (L1) coupled to the first-end-point, a second inductor (L2) coupled to the second-end-point, and the first and second inductors coupled together at a mid-point;
a near-field electric antenna having a first conductive surface and a second conductive surface;
wherein the first-end-point of the magnetic antenna is coupled to the first conductive surface of the electric antenna, and is configured to be coupled to a near-field receiver circuit;
wherein the second-end-point of the magnetic antenna is coupled to the second conductive surface of the electric antenna, and is configured to be coupled to the near-field receiver circuit;
wherein the mid-point of the magnetic antenna is configured to be coupled to the near-field transmitter circuit;
wherein the receiver circuit includes a first feed-point and a second feed-point;
wherein the first conductive surface of the electric antenna is directly coupled to the first feed-point of the receiver circuit; and
wherein the second conductive surface of the electric antenna is directly coupled to the second feed-point of the receiver circuit.

10. The device of claim 9:
further comprising a tuning circuit is coupled between the near-field magnetic antenna and the transmitter circuit.

11. The device of claim 10:
wherein the tuning circuit is not coupled between the near-field electric antenna and the receiver circuit.

12. The device of claim 10:
wherein the tuning circuit includes a variable capacitance and a variable resistance; and
wherein the first inductor, the second inductor, the variable capacitance and the variable resistance form a variable inductance.

13. The device of claim 9:
wherein the near-field electric antenna is configured to be directly connected to an LNA in the receiver circuit.

14. The device of claim 9:
wherein the first conductive surface is configured to be directly connected to a first input of an LNA in the receiver circuit; and
wherein the second conductive surface is configured to be directly connected to a second input of the LNA.

15. The device of claim 9:
wherein the mid-point of the magnetic antenna is directly coupled to a feed-point of the near-field transmitter circuit.

* * * * *